May 18, 1926.

P. KRÜGER 1,585,101

UNDERFRAME FOR RAILWAY CARS

Filed July 17, 1925

Inventor:
Paul Krüger,
By: Knight Bros
attys.

Patented May 18, 1926.

1,585,101

UNITED STATES PATENT OFFICE.

PAUL KRÜGER, OF ESSEN, GERMANY, ASSIGNOR TO FRIED. KRUPP AKTIENGESELL-SCHAFT, OF ESSEN-ON-THE-RUHR, GERMANY.

UNDERFRAME FOR RAILWAY CARS.

Application filed July 17, 1925. Serial No. 44,316.

The invention relates to underframes for railway cars of the kind described in U. S. Patent No. 1,493,682 of May 13, 1924, and consists in that the outer ends of the two axle springs of two neighboring pairs of wheels, the inner ends of which are connected to a common longitudinal compensating lever, are so connected to one another by a rigging, that an increased load acting on one of said springs is uniformly distributed to both springs.

Figure 1:
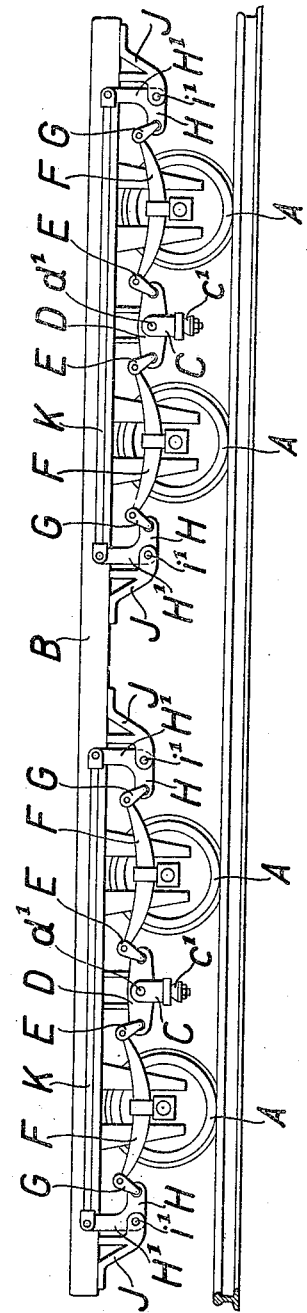
Figure 2:
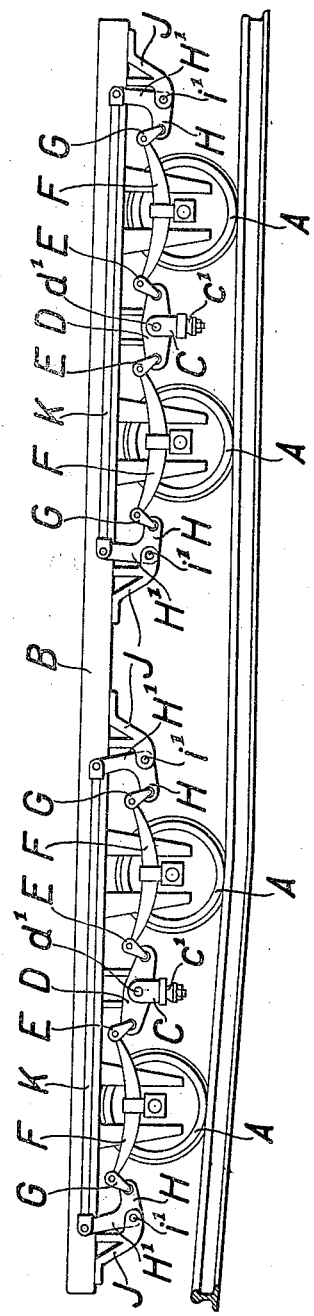

In the accompanying drawing is illustrated, as an embodiment of the subject-matter of the invention, an underframe of a railway car having four pairs of wheels arranged in two groups; Fig. 1 is an elevation of the underframe and Fig. 2 is a similar view with some parts in a different position.

A longitudinal compensating lever D swingable on a horizontal pin $d^1$ is provided on each side of the frame B for each group of pairs of wheels, these compensating levers being mounted in a swing fork C $c^1$ each. Each end of the compensating lever D has connected to it, by means of a shackle E, one end of the axle spring F, the outer end of which is attached each by a shackle G to the arm H of a bell crank lever H $H^1$. These levers H $H^1$ are each mounted for swinging motion by means of a horizontal pin $j^1$ in a bracket J depending on the frame B. The arms $H^1$ of two companion bell crank levers H $H^1$ are connected each to one another by a rod K.

When the railway car is on a level section of the track, the weight of the car is uniformly distributed to all pairs of wheels. The compensating levers D, axle springs F and bell crank levers H $H^1$ thus take the middle position shown in Fig. 1. When the car enters a strong rise section, see Fig. 2, for instance when pushed onto a travelling platform, then the axle first entering the rise and the axle most distant therefrom are subjected to axle pressures higher than those the other axles are subjected to. In consequence thereof the shackles G and E of the springs F of the axles under high load will transmit forces onto the bell crank levers connected to them and the appropriate compensating levers D and will rock them, as shown in Fig. 2. This rocking motion of the bell crank levers H $H^1$ is transmitted by the rods K onto the bell crank levers of the neighboring axle in a sense so as to cause the springs F of this latter axle to be more strongly tensioned. A further tensioning is imparted to these springs by the compensating levers D rocking by the intermediary of the shackles E. In consequence thereof the axle pressures will be compensated again so that all the axles are loaded nearly uniformly.

With the arrangement described in U. S. Patent 1,493,682 a compensation of the axle pressures likewise takes place, it is true, when the car enters a rise section; in entering high grade rises, however, as it is the rule with travelling platforms, the compensating levers are so much rocked that a perfect compensation of the axle pressures is no longer possible. The arrangement forming the subject-matter of the invention offers the advantage over that of the older patent that, under otherwise equal condition, the compensating levers will rock, in entering a rise section, by nearly half the angle only, so that a complete compensation of the axle pressures will take place even upon the car entering high grade rise sections.

Claims:

1. An underframe for railway cars comprising a plurality of pairs of wheels, axle springs, longitudinal compensating levers pivotally carried by the underframe and arranged to connect two neighboring axle springs to one another at their inner ends, a rigging connecting the outer ends of said springs and adapted to uniformly distribute to said springs the load acting on them.

2. An underframe for railway cars comprising a plurality of pairs of wheels, axle springs, longitudinal compensating levers pivotally carried by the underframe and arranged to connect two neighboring axle springs to one another at their inner ends, bell crank levers mounted on the underframe and one arm of which is pivotally connected to the outer end of one of said two springs, the other arms being pivotally connected to one another by a rod.

The foregoing specification signed at Cologne, Germany, this 24th day of June, 1925.

PAUL KRÜGER.